Jan. 25, 1966     A. G. TALBERT     3,231,309
DUMP TRAILER
Filed Jan. 9, 1964     3 Sheets-Sheet 1
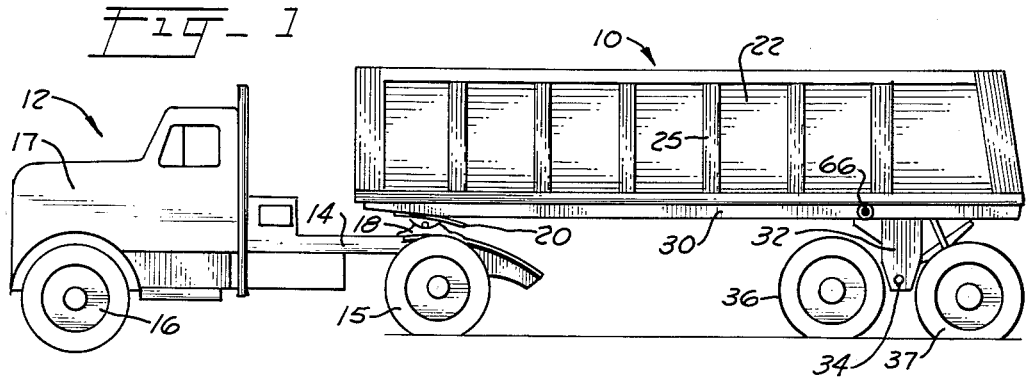
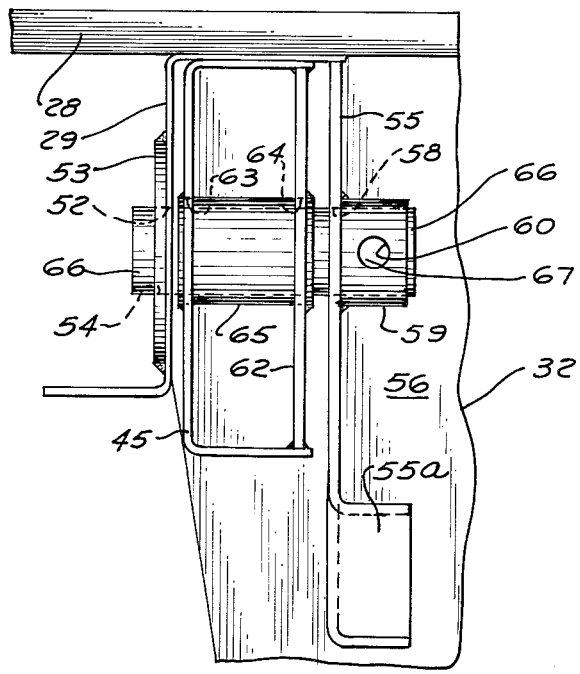
INVENTOR.
AUSTIN G. TALBERT
BY
Greist, Lockwood, Greenawalt & Dewey
ATTORNEYS

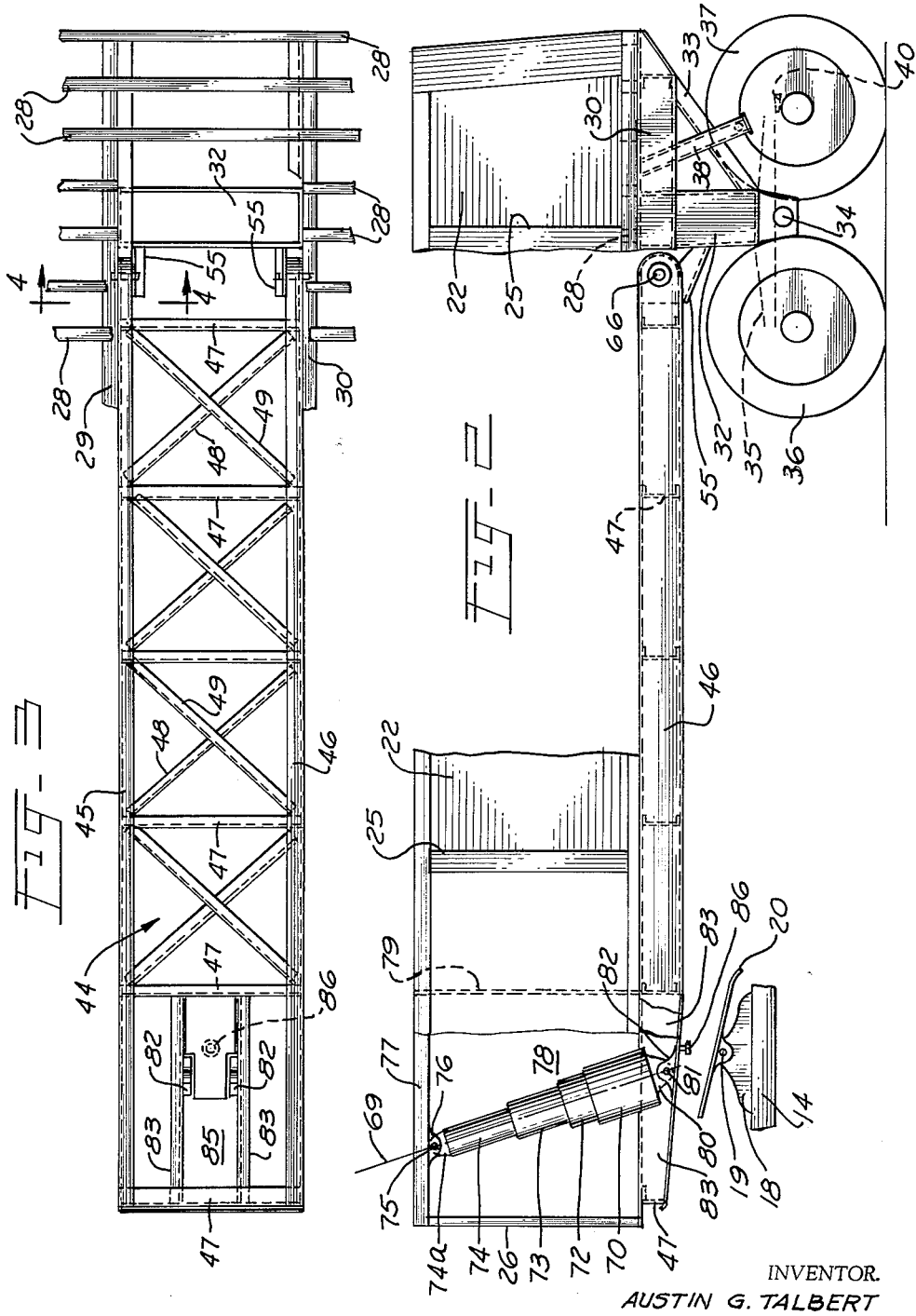

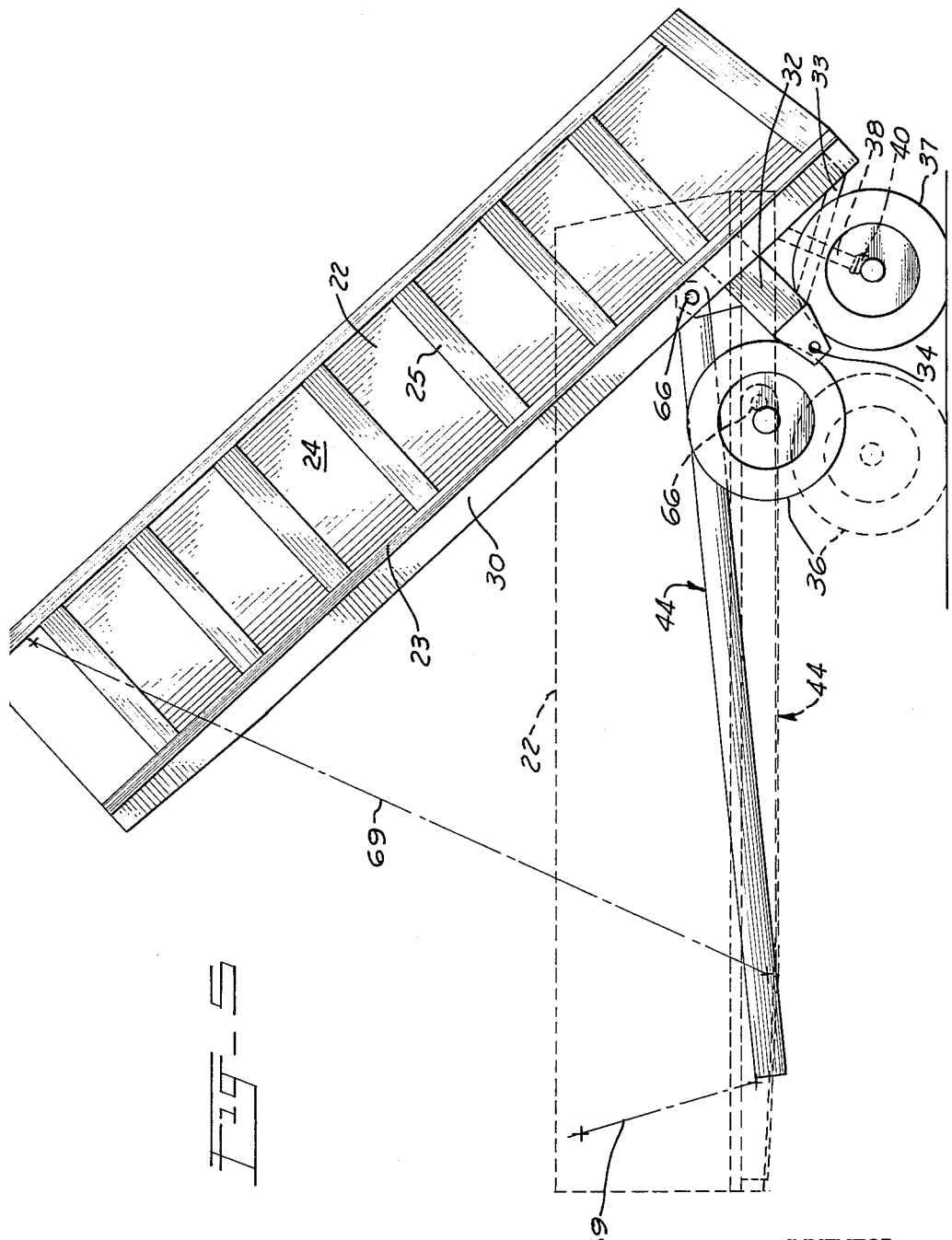

United States Patent Office 3,231,309
Patented Jan. 25, 1966

3,231,309
DUMP TRAILER
Austin G. Talbert, Rensselaer, Ind., assignor to Talbert Construction Equipment Company, Lyons, Ill., a corporation of Illinois
Filed Jan. 9, 1964, Ser. No. 336,765
1 Claim. (Cl. 298—17.5)

This invention relates generally to trailers and more particularly to a new and improved dump-type semi-trailer.

It is a primary object of the present invention to provide a new and improved dump-type semi-trailer which is adapted to be detachably connected to a conventional type of fifth wheel carried by a tractor.

It is another object of the present invention to provide a new and improved dump-type semi-trailer which includes a load carrying body having a draft member pivotally connected thereto, which draft member is adapted to be detachably connected to a conventional type of tractor fifth wheel and which body has its rear end directly supported by a ground contacting wheel assembly.

These and other objects and advantages of the invention will become apparent from the following specification disclosing a preferred embodiment of the invention which is illustrated in the accompanying drawings.

In the drawings:

FIG. 1 is a side elevation of one form of the dump-type semi-trailer of this invention showing the same connected with a tractor;

FIG. 2 is an enlarged, partially broken away, side elevational view of the trailer;

FIG. 3 is a top plan view of the draft member and a fragmentary rear portion of the understructure of the load carrying body;

FIG. 4 is an enlarged section taken along line 4—4 of FIG. 3 illustrating the pivotal connection between the draft member and the load carrying body; and FIG. 5 is a diagrammatic side elevation of the trailer showing the same in full lines in the dumping position and in broken lines in the hauling position.

Referring now to the drawings and in particular to FIG. 1, one form of the trailer of this invention, generally designated 10, is shown connected to a tractor, generally designated 12. Tractor 12, which of itself forms no part of the present invention, is of the usual type including a chassis 14 supported by ground engaging wheels 15, 16 and carrying a cab 17. Chassis 14 of the tractor carries a conventional form of fifth wheel which includes a pair of side-by-side fifth wheel brackets 18 (FIGS. 1 and 2), which brackets support trunnions 19 pivotally supporting a fifth wheel member 20 of known type. It will be understood that fifth wheel member 20 is supported on trunnions 19 for pivoting movement about a horizontal axis extending transversely of the tractor, and it will be understood that fifth wheel member 20 includes the usual king pin receiving opening and appropriate locking mechanism for detachable engagement with a king pin. It is emphasized that the fifth wheel described is of known form and is of the type found on most present day tractors.

Trailer 10 includes an elongated load carrying body 22 having a floor or bed 23. Body 22 includes spaced side walls 24 braced or re-inforced by spaced, vertically extending, structural members 25, and the body further includes a front wall 26 (FIG. 2). It will be understood that body 22 is open at the top thereof and includes a dump-type gate (not shown) at its rear end allowing the contents of the trailer to be discharged when the forward end of the body is swung upwardly or elevated as shown in solid lines in FIG. 5.

Bed 23 of the body is supported on a number of transversely extending spaced beams 28, which beams are in turn carried by a pair of parallel, spaced, longitudinally extending Z-type structural members 29 and 30.

Body 22 further includes a depending box-like structural assembly 32 which extends transversely of the body and is suitably secured to the same between Z-members 29 and 30. Assembly 32 is braced from body 22 by a pair of laterally spaced, inclined braces 33. Member 32 includes means supporting a pair of oppositely extending trunnions 34 for pivotal engagement with a known type of tandem ground contacting wheel assembly. Trunnions 34 are journaled in bearings associated in laterally spaced, longitudinally extending spring assemblies 35 which are mounted to forward wheels 36 and rear wheels 37. The wheel assembly itself may be of any well known type. A pair of laterally spaced, inclined, depending post members 38 are connected at their upper ends to respective Z-members 29, 30, and are suitably connected adjacent their lower ends to inclined braces 33. The ends of post members 38 are adapted to abut respective pads 40 carried on the rear axle of the tandem wheel assembly for limiting the amount of swinging movement of body 22 relative to the wheel assembly during tipping of the former, it being understood that the tandem wheel assembly is adapted for limited pivoting movement with respect to the body about a horizontal transverse axis defined by trunnions 34. It will be realized that body 22 including beams 28, structural members 29, 30, and assembly 32 are all secured together, as by welding, to form an integral body unit.

As best seen in FIGS. 2 and 3, an elongated draft member 44 extends generally lengthwise of elongated bed 22 and includes parallel, laterally spaced, longitudinally extending side beams 45 and 46. Members 45 and 46 are preferably channel members having the flanges thereof extending inwardly of the draft member. Beams 45 and 46 are maintained in parallel spaced relation by a plurality of spaced, transversely extending members 47 and by cross brace members 48 and 49. The rear end of draft member 44 is pivotally secured to body 22 just forward of the portion of the latter which is connected to structural box assembly 32. The pivotal connection between beam 45 of draft member 44 and Z-member 29 of body 22 is best illustrated in FIG. 4; it will be understood that body 22 and draft member 44 are symmetrical about their longitudinal center lines and therefore identical but opposite hand construction is provided for pivotally connecting beam 46 with Z-member 30.

Z-member 29 of body 22 is arranged so that its upper flange extends inwardly of the body and its lower flange extends outwardly of the same. Z-member 29 includes an aperture 52 and a re-inforcing plate 53 is secured, as by welding, to the outside surface of the web of member 29 around opening 52 formed therein. Plate 53 includes an opening 54 in alignment with opening 52 and of the same diameter as the latter.

Body 22 includes a vertically extending web plate 55 mounted in spaced relation with the web of Z-member 29. Web plate 55 has an upper horizontal edge secured to the underside of the upper flange of Z-member 29 near the margin thereof. Web plate 55 has a rear vertical edge secured, as by welding, to the outside surface of a plate 56 which defines the front of structural box assembly 32. Web plate 55 includes an inclined, inwardly extending flange 55a at its lower portion for re-inforcing web plate 55. The web plate 55 further includes an aperture 58 in alignment with openings 52, 54 and of the same diameter as the latter. A cylindrical collar 59 has one end thereof secured, as by welding, to the inside surface of web plate 55 around opening 58 therein, the inside diameter of collar 59 being the same as the diameter of opening 58. Collar 59 includes a bore 60 in the wall thereof.

The upper flanges of Z-members 29 and 30 rest on the upper flanges of respective beams 45, 46 of draft member 44 when body 22 is in its horizontal or hauling position. The rear ends of beams 45, 46 are rounded as illustrated in FIG. 2. As noted in FIG. 4, beam 45 includes a web plate 62 at the rear end thereof, which web plate extends a short distance longitudinally of beam 45. Web plate 62 has upper and lower horizontal edges secured to the inside surfaces of respective upper and lower flanges of channel beam 45. Beam 45 and web plate 62 include respective aligned openings 63 and 64 of the same diameter and mount opposite ends of a sleeve 65. A pivot pin 66 is rotatably received within sleeve 65, which pivot pin has its respective opposite ends mounted in the openings in web plate 55 and the web of Z-member 29. Pivot pin 66 includes a transverse bore (not shown) at the inner end thereof for receiving a keeper pin 67 which has its outer end recived in bore 60 of collar 59.

It should be apparent that by the construction thus far described, body 22 is pivotally mounted to the rear of draft member 45 for swinging movement about a horizontal transverse axis defined by pivot pins 66.

Power means, preferably a fluid operated piston and cylinder, are provided for swinging or raising body 22 between its hauling position and its dump position and for lowering the body from its dumping position to its hauling position. A suitable fluid operated piston and cylinder of known type is illustrated in FIG. 2. This piston and cylinder, which has a longitudinal central axis 69, includes telescopingly disposed cylinders 71, 72 and 73 and a piston rod 74. It will be understood that piston rod 74 has one end thereof attached to a piston (not shown) received within cylinder 73.

The upper end of piston rod 74 includes an ear plate 74a pivoted on a pin 75, which pin has its respective opposite ends secured in a pair of ear plates 76 suitably secured to longitudinal structural members 77 which partly define a compartment 78 in the forward portion of body 22. Compartment 78, which is provided for separating the contents of body 22 from the piston and cylinder, is defined by spaced side walls (not shown) parallel with respective members 78, front wall 26 and a rear wall 79. Lowermost cylinder 70 includes an ear plate 80 pivoted on a pin 81, which pin has its respective opposite ends mounted in a pair of ear plates 82. Ear plates 82 are secured to respective longitudinally extending beams 83 which form a part of draft member 44, opposite ends of beams 83 being secured between the forwardmost pair of transversely extending brace members 47. It should be apparent that extension of the hydraulic piston and cylinder assembly results in raising the forward portion of body 22 for pivoting movement of the body about the axis defined by pivot pins 66. Preferably, a source of fluid pressure is carried by tractor 12 and connected with the piston and cylinder assembly by suitable flexible conduit means for extension of the piston and cylinder.

A flat plate 85 is secured to the underside of draft member 44 at the front end thereof. Plate 85 (FIG. 3) which is inclined slightly upwardly toward the front end of draft member 46, is preferably co-planar with the lower flanges of beams 45 and 46 and secured to the latter as well as to the undersides of beams 83. Plate 85 extends longitudinally of draft member 45 between the first pair of transversely extending brace members 47. Plate 85 supports a depending kin pin 86 of known type, which king pin is adapted to be received and locked in the associated opening in any known form of fifth wheel member. It will be understood that when king pin 86 is received and locked to such a fifth wheel member, e.g., fifth wheel 20, plate 85 rests on the surface of the latter. Thus, draft member 44 pivots with fifth wheel 20 about the axis defined by trunnions 19. Of course, during turning of the tractor-trailer, draft member 44 pivots about a vertical axis defined by king pin 86. Therefore, it will be apparent that the connection between the draft member and the fifth wheel is of conventional construction.

FIG. 5 schematically illustrates the operation of the trailer as the body thereof is moved between its hauling and dumping positions and vice versa. As seen in FIG. 5, extension of the piston and cylinder assembly results in raising the forward portion of the body 22 for pivoting or swinging of the latter about pivot pins 66. During initial lifting of the forward portion of body 22, the latter pivots about trunnions 34 of the ground contacting wheel assembly. During continued lifting of the forward portion of the body the ends of inclined braces 38 contact stops 40 on the rear axle of the wheel assembly and the forward wheels of the wheel assembly are then lifted to the solid line position indicated in FIG. 5. During raising of body 22, the brakes of the trailer wheel assembly or the brakes on the wheels of tractor 12 must be released to allow the tractor and the wheel assembly of the trailer to approach each other. It will be apparent that during a dumping operation a major portion of the weight of the load carried by body 22 is supported by at least the rear wheels of the trailer ground contacting wheel assembly thereby reducing the load that must be taken by pivot pins 66.

It should now be apparent that this invention provides a dump-type semi-trailer of new and improved construction. The draft member 44 is adapted for connection with a conventional pivoting type of tractor fifth wheel. As the draft member is pivoted to the trailer body near the rear end of the latter, the draft member partakes of only limited swinging movement during a dumping operation, this swinging movement being within the limit of pivot afforded by the fifth wheel member; therefore, the use of a special fifth wheel is obviated. Further, by pivoting the draft member to the body a short distance forwardly of the rear end of the latter, the trailer wheel assembly may be directly connected to the load carrying body thereby facilitating construction of the latter and mounting or attaching of the trailer wheel assembly.

While the invention has been shown in but one form it will be obvious to those skilled in the art that it is not to be so limited. On the contrary the invention is susceptible of various changes and modifications without departing from the spirit and scope of the appended claim.

I claim:

In combination, a tractor having a fifth wheel mounted thereon for pivoting movement about a horizontal axis disposed transversely of the tractor, a trailer including an elongated load carrying body, a ground contacting wheel assembly connected to the rear end of said body for supporting the latter, an elongated draft member of unitary frame construction, said draft member extending generally lengthwise of the body in supporting engagement with the underside of the latter, which draft member has one end thereof pivotally connected to said body intermediate the ends of the latter but substantially nearer said rear end of the body than the other end thereof thereby to permit swinging movement of the body about a horizontal axis extending transversely thereof, said draft member having a generally horizontally disposed plate rigidly secured to the underside of its other end and supporting a depending king pin, which plate rests on said fifth wheel member with said king pin being rotatably received in the associated opening in the fifth wheel thereby to connect the draft member to the fifth wheel for pivoting movement about the axis of the king pin and the first mentioned horizontal axis, and a fluid operated piston and cylinder assembly pivotally connected at its respective opposite ends to said other end of the draft member and to the other end of the body, whereby upon extension of the piston and cylinder assembly said body is swung to its dump position by swinging relative to said draft member about the second mentioned horizontal axis and said draft member is pivoted with the fifth wheel about the first mentioned horizontal axis.

References Cited by the Examiner

UNITED STATES PATENTS

| | | | |
|---|---|---|---|
| 3,003,818 | 10/1961 | Merchant | 298—20 |
| 3,027,197 | 3/1962 | Tripodi | 298—20 |
| 3,055,710 | 9/1962 | Black | 298—17.5 |
| 3,149,881 | 9/1964 | Felburn | 298—20 |
| 3,158,402 | 11/1964 | Clement | 298—20 |

FOREIGN PATENTS 576,025　4/1958　Italy.

BENJAMIN HERSH, *Primary Examiner.*

RALPH D. BLAKESLEE, ARTHUR L. LA POINT,
*Examiners.*